United States Patent Office 2,833,813
Patented May 6, 1958

2,833,813

PREPARATION AND USE OF PERACETIC ACID

John G. Wallace, Lewiston, N. Y., assignor to E. I. du Pont de Nemours and Company, Wilmington, Del., a corporation of Delaware No Drawing. Application December 18, 1952
Serial No. 326,772

8 Claims. (Cl. 260—502)

This invention relates to the preparation of peracetic acid. More particularly, it relates to the preparation of peracetic acid from acetaldehyde via the peroxide prepared by the autoxidation of acetaldehyde and to the use of such peracetic acid.

Peracetic acid is usually prepared by the reaction of high strength hydrogen peroxide with acetic anhydride or acetic acid. This method is not generally satisfactory for cost reasons and because of the exothermic nature of the reaction. Furthermore, the resulting solution of peracetic acid necessarily contains relatively large amounts of acetic acid. Since it is not safe to remove the peracetic acid from such solutions, they are used as such even through the large amount of acetic acid present may be disadvantageous for various uses.

There are claims in the literature that peracetic acid may be prepared by the oxidation of acetaldehyde. It is believed that these claims are inaccurate and that the peroxide compound isolated by the procedures of the literature is actually an addition compound of peracetic acid with acetaldehyde. Young, Chemistry and Industry, 1949, page 777, discusses such earlier claims to the preparation of peracetic acid and concludes that the peroxide actually isolated from the oxidation of acetaldehyde is probably acetaldehyde hemiperacetate. Young cites the work of Lösch who isolated a peroxide of melting point 22° C. and approximate molecular weight of 105 from the oxidation product of acetaldehyde.

It is an object of the present invention to provide a method for producing peracetic acid from the relatively cheap raw materials, acetaldehyde and oxygen or air. A further object is a method for producing peracetic acid from the peroxide product resulting from the autoxidation of acetaldehyde. Another object is a method for producing peracetic acid from the product resulting from the autoxidation of acetaldehyde and of utilizing the peracetic acid as it is formed, for example, to effect the hydroxylation or epoxidation of olefinically unsaturated organic compounds. A still further object is to provide a method for obtaining a solution of peracetic acid in an inert solvent. Other objects will be apparent from the following description.

It is now fairly well established as indicated in Example 1 of the copending application of Golding, Serial Number 326,773, filed December 18, 1952, that the product obtained by the autoxidation of acetaldehyde is actually acetaldehyde hemiperacetate,

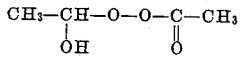

or some addition compound of peracetic acid and acetaldehyde of the same empirical formula $(C_4H_8O_4)$. Accordingly, the autoxidation product is hereinafter referred to for the sake of convenience as acetaldehyde hemiperacetate, or simply as the "hemiperacetate." It should be understood, however, that in doing so, reference to the active oxygen-containing acetaldehyde autoxidation product is intended, whether or not it actually is the above hemiperacetate.

The present invention is based upon the discovery that acetaldehyde hemiperacetate dissociates rapidly in the presence of a strong acid, i. e. one having a dissociation constant of at least $1.0 \times 10^{-4}$, to yield acetaldehyde and peracetic acid. Dissociation of the hemiperacetate into acetaldehyde and peracetic acid does not take place to any practical extent in the absence of a suitable catalyst. Accordingly, practice of the present invention will involve the use of such a strong acid as a catalyst for the dissociation reaction. However, peracetic acid is very unstable in the presence of acetaldehyde with which it reacts readily. Therefore, in order to prevent its useless destruction by the acetaldehyde simultaneously formed, it is necessary either to utilize the peracetic acid as it is formed in some useful reaction, or to remove by some other means the by-product acetaldehyde from the reaction mixture substantially as rapidly as it is formed. Thus, if it is desired to convert the hemiperacetate to a solution of peracetic acid as a final or intermediate product, the hemiperacetate is subjected to the action of a strong acid while the acetaldehyde is removed from the reaction mixture, e. g. by distillation, substantially as fast as it is formed. On the other hand, the active oxygen content of the hemiperacetate can be usefully employed by adding to the dissociation reaction mixture, i. e. the mixture containing the hemiperacetate and the acid catalyst, a substance which will react with the peracetic acid as it is formed to produce a useful product. Suitable peracetic acid acceptors for this purpose are the olefinically unsaturated organic compounds which are known to be hydroxylated or epoxidized by peracetic acid depending upon the reaction conditions.

One way of practicing the invention is to add a solution of the hemiperacetate in an inert solvent to a solution of a strong acid in an inert solvent, while maintaining this second solution at such temperature and pressure conditions as will effect distillation from the resulting mixture of the by-product acetaldehyde as fast as it is formed. Thus, a benzene solution of the hemiperacetate can be added continuously to a benzene solution of p-toluene sulfonic acid maintained under refluxing conditions, while continuously removing the acetaldehyde as overhead product. By such an operation, the hemiperacetate is continuously dissociated catalytically into its component compounds and the by-product acetaldehyde is continuously stripped from the reaction mixture to leave a solution of peracetic acid in the solvent as the still residue. This residual solution will be free of acetaldehyde and free of large amounts of acid. The presence of a small amount of acid in the product solution is generally desirable since it assures against basic conditions which are generally unfavorable to stability of the product.

The practice of the invention is illustrated by the following examples.

Example 1

Acetaldehyde (44 g.) dissolved in benzene (100 ml.) was placed in a flask fitted with a thermometer well, a sampling tube, a gas outlet with a safety blow-off, and an inlet for delivering oxygen to the system. The flask and contents were cooled in an ice bath while being agitated by a mechanical shaker. The system was subjected to the action of oxygen gas at an oxygen pressure of 100 mm. (Hg) while maintaining the flask contents at 0 to 2° C. until a standard iodometric titration showed that a peroxide, calculated as acetaldehyde hemiperacetate, was present in an amount corresponding to 10.9% of the weight of the solution. Unreacted acetaldehyde was then distilled off at 0° C., 43 mm. (Hg). The residual solution of the hemiperacetate in benzene was siphoned during about 20 min. into a solution of 2 ml. of C. P. formic acid in 40 ml. of benzene contained in a still pot maintained at 0° C., while the liberated acetaldehyde was simultaneously distilled from the still pot through a Vigreux column at 430 mm. (Hg). The resulting pot residue was a solution of peracetic acid in benzene containing 5.2% of peracetic acid by weight.

Organic compounds, such as oleic acid, which contain olefinic carbon to carbon double bonds are readily epoxidized by reaction with peracetic acid under suitable conditions. Since this type of reaction is known to be characteristic of peracetic acid, 7.7 g. of oleic acid was added to the benzene solution of peracetic acid obtained as described above and the resulting mixture was agitated at 0° C. for 15 hours. The mixture was then poured into 300 ml. of ice water. The organic layer was separated, washed with water until free of acid and of active oxygen, and then dried over anhydrous calcium sulfate. Benzene was stripped from the dried solution by vacuum distillation to leave an oily solid which upon analysis by the method of King, Nature 164, 706 (1949), was found to contain 9,10-epoxystearic acid in an amount corresponding to a 12% yield based on the oleic acid charged.

Acetaldehyde hemiperacetate, in the absence of a dissociation catalyst, does not epoxidize oleic acid.

Example 2

Acetaldehyde, 44 g. diluted to 100 ml. with benzene was autoxidized substantially as described in Example 1 to obtain a solution containing 5.2% by weight of acetaldehyde hemiperacetate. The unreacted acetaldehyde was distilled off at 0° C. through a short column. Oleic acid, 3.3 g. was added to the resulting solution of the hemiperacetate in benzene and epoxidation of the oleic acid was effected in the presence of about 0.03 g. of p-toluene sulfonic acid at 0° C. during 24 hours. A lard-like solid, recovered from the reaction mixture in the manner described above, analyzed 31% 9,10-epoxystearic acid by weight.

Example 3

Acetaldehyde, 44 g. dissolved in benzene was autoxidized as described in the preceding examples until the resulting mixture contained 11.8% acetaldehyde hemiperacetate by weight. The unreacted acetaldehyde was flushed out with nitrogen. Oleic acid, 8.1 g., was then added and epoxidation of the oleic acid was effected as described in Example 2 to obtain a 23% yield of 9,10-epoxystearic acid, based on the oleic acid used.

The catalytic conversion of acetaldehyde hemiperacetate to peracetic acid and acetaldehyde in accordance with the invention is conveniently and preferably effected at temperatures of from about —5° C. to about 30° C. Higher and lower temperatures can be used. Thus, temperatures up to the atmospheric boiling point of the solvent, e. g. 80° C. for benzene, and down to —40° C. or lower are effective. However, at such higher temperatures by-product formation becomes excessive while such lower temperatures are less convenient. When the invention is practiced to recover peracetic acid as a product, the use of pressures less than atmospheric to maintain the desired temperature and to facilitate distillation of acetaldehyde from the reaction mixture as fast as it is formed, is both convenient and effective. However, other methods can be employed for stripping out by-product acetaldehyde, e. g. by passing an inert gas such as nitrogen through the reaction mixture.

If the peracetic acid is to be utilized in the mixture in which it is formed by dissociation of acetaldehyde hemiperacetate, there should be present in that mixture during the dissociation reaction an acceptor for the peracetic acid. The acceptor should be one which will react with the peracetic acid under the conditions employed. Those organic compounds whose molecular structure includes an olefinic carbon to carbon double bond constitute a class of compounds which are known to react with peracetic acid under the conditions which will most generally prevail when acetaldehyde hemiperacetate is dissociated in accordance with the present invention to yield peracetic acid. Such unsaturated organic compounds are, therefore, generally suitable for use as peracetic acid acceptors when the peracetic acid is to be used as it is formed. Specific examples of compounds suitable for use as acceptors are the olefinically unsaturated aliphatic carboxylic acids and alcohols, such as oleic, undecylenic and linoleic acids; oleyl, linoleyl, ricinoleyl, allyl and crotyl alcohols; esters of such acids and alcohols; and olefinically unsaturated hydrocarbons such as the amylenes, the hexylenes, cetene, cyclohexene, cyclooctene and butadiene.

If it is desired to employ the peracetic acid to epoxidize an unsaturated compound of the above type, conditions favoring epoxidation should be employed. These generally will include the use of relatively low temperatures, e. g. not higher than about 25° C. and the absence of strong mineral acids. If a hydroxylation reaction is to be effected, the presence of a strong mineral acid, e. g. sulfuric acid, is permissible and may be desirable and somewhat higher temperatures may be used.

Any strong acid having a dissociation constant of at least $1.0 \times 10^{-4}$ whose anion is inert in the reaction mixture can be used to catalyze the dissociation of acetaldehyde hemiperacetate. Examples of such acids are formic acid, the chloracetic acids, fumaric acid and lactic acid; the alkane and aromatic sulfonic acids, such as p-toluene sulfonic acid; sulfuric acid, hydrochloric acid and phosphoric acid. Strongly acidic salts such as boron trifluoride, ferric chloride and aluminum chloride can also be used, particularly when employed in combination with a solvent such as benzene. Acetic acid is an example of an acid which is too weak for the present use. In general, the organic acids such as p-toluene sulfonic acid and formic acid are preferred over inorganic acids, e. g. when the peracetic acid is to be used for epoxidation purposes. However, inorganic acids such as sulfuric acid can be used, particularly when the peracetic acid is to be employed to hydroxylate unsaturated substances.

The concentration of the acid catalyst in the mixture in which dissociation of the acetaldehyde hemiperacetate is effected should be sufficient to render the mixture distinctly acidic. Most generally the concentration of the catalyst will be about 0.01 to 5% by weight, the preferred range being 0.1 to 5%. Higher concentrations, e. g. up to 10% or more, can be used but result in no added advantage.

Any non-aqueous liquid which is inert under the conditions of use to the hemiperacetate, the reaction products and the catalyst can be used as the reaction medium in effecting the conversion of the hemiperacetate to peracetic acid. Inert non-polar solvents are preferred. These include benzene and simple alkyl derivatives of benzene such as toluene, the xylenes and ethyl benzene; saturated aliphatic hydrocarbons such as hexane, heptane, octane and petroleum ether; and various fluorinated or chlorinated hydrocarbons. The amount of solvent employed should be sufficient to permit adequate temperature control under the conditions of use but otherwise is not critical. Ordinarily, about 2 to 25 parts of the solvent per part by weight of the hemiperacetate to be converted will be satisfactory, 4 to about 7 parts of solvent per part of hemiperacetate being preferred.

The acetaldehyde hemiperacetate to be used in practicing the invention can be made by any desired method, e. g. by the autoxidation of acetaldehyde using procedures described in the literature. Such autoxidation can be effected by reacting liquid acetaldehyde in the presence or absence of an inert solvent with gaseous oxygen, air or any other mixture of oxygen with an inert gas such as nitrogen. When a solvent for the acetaldehyde is used, a non-polar solvent such as benzene, toluene, the xylenes and the saturated aliphatic hydrocarbons such as hexane, heptane, octane and petroleum ether, is generally preferred. However, various polar solvents such as acetic acid, acetone and ethyl acetate can be used so long as they are inert under the conditions of use. Temperatures in the range $-70°$ C. to about room temperature or somewhat higher can be used, the preferred temperatures being in the range of about $-20$ to $10°$ C.

Peracetic is useful for hydroxylating or epoxidizing olefinically unsaturated organic compounds. It is also useful as a bleaching agent, as a germicide and for other purposes.

I claim:

1. The method of dissociating acetaldehyde hemiperacetate to peracetic acid comprising subjecting said hemiperacetate to the action of a strong acid having a dissociation constant of at least $1.0 \times 10^{-4}$.

2. The method of dissociating acetaldehyde hemiperacetate to peracetic acid comprising subjecting said hemiperacetate to the action of a strong acid having a dissociation constant of at least $1.0 \times 10^{-4}$ while simultaneously removing by-product acetaldehyde as it is formed in the reaction mixture.

3. The method of dissociating acetaldehyde hemiperacetate to peracetic acid and of employing said peracetic acid as it is formed comprising subjecting said hemiperacetate to the action of a strong acid having a dissociation constant of at least $1.0 \times 10^{-4}$ in the presence of an acceptor for said peracetic acid.

4. The method of claim 3 wherein the peracetic acid acceptor is an olefinically unsaturated organic compound.

5. The method of claim 1 wherein the strong acid is an organic acid the concentration of which in the reaction mixture is in the range 0.01 to 10% by weight and the temperature is $-5$ to $30°$ C.

6. The method of claim 2 wherein the strong acid is an organic acid the concentration of which in the reaction mixture is in the range 0.01 to 5% by weight.

7. The method of claim 3 wherein the strong acid is an organic acid the concentration of which in the reaction mixture is in the range of 0.01 to 5% by weight.

8. The method of claim 4 wherein the strong acid is an organic acid the concentration of which in the reaction mixture is in the range 0.01 to 5% by weight.

References Cited in the file of this patent

UNITED STATES PATENTS

| 1,179,421 | Galitzenstein et al. | Apr. 18, 1916 |
| 2,314,385 | Bludworth | Mar. 23, 1943 |

FOREIGN PATENTS

| 272,738 | Germany | Apr. 6, 1914 |
| 730,116 | Germany | Mar. 19, 1943 |
| 226,012 | Switzerland | June 16, 1943 |

OTHER REFERENCES

Conant et al.: The Chemistry of Organic Compounds, 4th ed., pp. 161–162 (1952).

Tobolsky et al.: Organic Peroxides, pp. 35–36 (1954).

Swern: Chem. Reviews, vol. 45, pages 5 to 8 (1949).

Findley et al.: J. Am. Chem. Soc., vol. 67, pages 412–44 (1945).